3,498,924
PROCESS FOR PREPARING STABLE
SODIUM HYPOCHLORITES
Robert H. Walsh, Akron, and Albert Dietz, Wadsworth, Ohio, assignors to PPG Industries Inc., Pittsburgh, Pa., a corporation of Pennsylvania
No Drawing. Filed Mar. 10, 1966, Ser. No. 533,247
Int. Cl. C01b *11/06;* A61b *13/00;* D06l *3/08*
U.S. Cl. 252—187                  2 Claims

ABSTRACT OF THE DISCLOSURE

Solid, dry, stable sodium hypochlorite compositions are prepared by reacting sodium hydroxide with hypochlorous acid which is substantially free of chloride ion. Liquid water of solution is removed to produce a dry, hydrated, solid sodium hypochlorite which can be further dehydrated by vacuum drying, or may be admixed with sodium hydroxide to replace the released water of hydration which when removed provides stable, dry, basic sodium hypochlorites.

---

This invention relates to solid, stable chlorine-containing compounds and to their preparation. It especially relates to substantially pure, stable sodium hypochlorite preparations which are dry, crystalline solids. Further related is the special usefulness of these preparations as solid, stable, substantially pure bleaching agents.

Aqueous solutions of sodium hypochlorite are commonly used as bleaching agents especially for home and commercial laundry bleaching of cellulosic materials. These solutions are also useful as disinfecting agents, for example, in dairies, restaurants and water purification. However, since such aqueous solutions are greatly diluted (usually containing 15 percent by weight or less of the hypochlorite to guard against otherwise uncontrollable heat and light decomposition), the bleaching effectiveness is greatly diminished.

Likewise, the large amount of water required to dilute the hypochlorite makes it inconvenient to handle and package. Such dilution also reduces the active-chlorine content to a disadvantageous level. Such inconveniences and disadvantages are overcome in the present invention by the preparation of a dry, solid sodium hypochlorite.

Although solid, dry formulations have been known in the prior art, such have required large amounts of stabilizing materials with the consequences of low levels of active-chlorine content. Thus, United States Patent No. 2,145,015 recites the preparation of powders containing but 4 percent available chlorine or about 3 percent by weight sodium hypochlorite in the total composition. The remaining materials are stabilizing compounds and solid diluents which protect the hypochlorite from decomposition. Similarly, United States Patent No. 2,524,394 recites the preparation of sodium hypochlorite compositions containing only about 5 weight percent sodium hypochlorite. Thus, the inconveniences of handling liquid products are avoided, but the stabilization problem is not with the result that greatly diluted formulations are provided which consequently contain diminished amounts of the active hypochlorite compound rendering them less effective in their bleaching activity.

One important reason for the acute instability of these hypochlorites stems from their method of preparation. This method involves chlorinating a solution of sodium hydroxide. The by-product from this preparation is sodium chloride. It appears that the presence of chloride ion in this reaction catalyzes the decomposition of sodium hypochlorite to sodium chlorate and sodium chloride thus destroying the active-chlorine properties of the composition. This decomposition may be retarded by the presence of considerable amounts of alkaline material such as sodium hydroxide and the reaction is commonly stopped short to insure that an excess of alkali is present. The inherent presence of chloride ion from these preparations has defeated the possibility of providing stable, dry compositions high in active-chlorine (hypochlorite) content. Rather, large amounts of diluents and stabilizing materials are required to protect them from the extreme instability inherent with these sodium hypochlorites.

Thus, the possibility of preparing solid, stable, substantially pure sodium hypochlorite compositions has been heretofore regarded as very difficult if not impossible. The extreme instability of these compositions is recognized such as to render them incapable of properly being utilized as a solid. The resulting marketable product is thus low in active-chlorine content making it undesirable especially from an efficiency standpoint.

In accordance with this invention, it has been discovered that solid sodium hypochlorite may be prepared by a novel process which does not introduce the chloride ion. Thus, this invention utilizes a chloride-ion free process to provide substantially pure, dry, crystalline sodium hypochlorite preparations which, by virtue of their unique method of preparation and the consequent absence of decomposition promoter, are stable on storage and, hence, are useful as solid bleaching and disinfecting agents. As noted hereinbefore, such compositions have been heretofore impossible in accordance with the prior art because of extreme instability and reduced purity. However, the process of this invention provides stable, solid compositions high in active-chlorine content thereby overcoming the problems of the prior art.

In accordance herewith, novel compositions comprised essentially of crystalline hydrated sodium hypochlorites which compositions are substantially free of chloride ion and stable on storage are provided by reacting in aqueous medium hypochlorous acid substantially free of chloride ion with sodium hydroxide. The product is thereafter recovered and dried to remove liquid water of solution and the dry, stable hydrated sodium hypochlorite is obtained.

As a further embodiment hereof, essentially anhydrous sodium hypochlorite is provided by continued drying of the hydrated sodium hypochlorite preparations whereby to remove liquid water of solution and hydration.

As a further embodiment hereof, novel compositions comprised essentially of crystalline basic sodium hypochlorites which compositions are substantially free of chloride ion and stable on storage are provided by further treatment of the dry, solid hydrated sodium hypochlorite preparations which treatment is comprised of intimately admixing solid sodium hydroxide to the solid hydrated hypochlorite preparations. The mixture is thereafter dried to remove replaced liquid water of hydration and the dry, stable basic sodium hypochlorite is obtained.

These novel compositions find uses as bleaching and disinfecting agents and other uses which require an active-chlorine compound. These dry, solid compositions are conveniently handled and are high in active-chlorine (hypochlorite) content rendering them highly efficient. At the same time, loss of bleaching activity from decomposition is at a minimum with these stable preparations.

It will be noted that tetrabasic sodium hypochlorite contains about 31.7 weight percent sodium hypochlorite the chlorine of which is essentially all available chlorine, i.e., chlorine in the $+1$ oxidation state. The hemibasic sodium hypochlorite contains large amounts, about 78.8 weight percent, of hypochlorite and is thus very high in available chlorine.

In a similar manner, the hydrated sodium hypochlorites of which dihydrated sodium hypochlorite is the most useful are also very high in available chlorine. For example, dihydrated sodium hypochlorite contains about 67.4 weight percent sodium hypochlorite.

Thus, it will be recognized that solid, stable sodium hypochlorite preparations which contain large amounts of the active-chlorine component, viz., hypochlorite, and which have been previously unobtainable by prior art processes are readily obtainable by the process contemplated herein. Previously, solid compositions containing well below 10 weight percent of the active hypochlorite were the only available preparations. Hypochlorite preparations which are stable on storage and contain much more, commonly more than 30 weight percent and often upwards of 80 weight percent (usually more than 50 weight percent), of the active hypochlorite component are readily obtained by the process disclosed herein.

In the practice hereof, hypochlorous acid which is substantially free of chloride ion is conveniently added to an aqueous solution of sodium hydroxide to a steady pH, preferably from about pH 6 to 14, usually about pH 12. The reaction medium is commonly maintained at a relatively low temperature such as about 0° C. After a suitable reaction period, the resulting solution containing formed sodium hypochlorite is filtered and is preferably vacuum evaporated at moderate temperatures (usually at or below 45° C.) and low pressures (usually about 1 millimeter mercury pressure) to provide dry, crystalline, stable hydrated hypochlorite preparations such as dihydrated sodium hypochlorite.

If the hydrated sodium hypochlorite preparation is further dried, e.g., under vacuum, there is recovered a dry, crystalline anhydrous sodium hypochlorite.

A further process involves the continued treatment of the prepared hydrated hypochlorite to provide a basic hypochlorite product. This treatment is comprised of intimately admixing such as by ball-milling means the prepared hydrate hypochlorite such as dihydrated sodium hypochlorite with solid sodium hydroxide. The hydroxide responds to this treatment by replacing the water of hydration of the hydrated hypochlorite which released water of hydration is subsequently removed by drying. Thus, dry, crystalline, stable basic sodium hypochlorite preparations such as dibasic sodium hypochlorite are prepared.

Hypochlorous acid which characterizes one reactant of the contemplated reaction is provided by a preferred method from the reaction of chlorine monoxide and water. It can be and of necessity is obtained as a very pure (especially free of chloride ion) aqueous solution by this method. Of consequence with this method of preparing a hypochlorous acid solution, which is substantially free of chloride ion, is its usefulness for the process contemplated herein.

Solutions of hypochlorous acid may vary in concentration. Concentrated solutions may be unstable and, consequently, dilute solutions are most commonly employed. A range of hypochlorous acid solutions containing varying amounts of the active-chlorine constituent are thus useful as herein contemplated. This range may extend from solutions containing about 50 grams per liter hypochlorous acid to about 300 grams per liter hypochlorous acid; however, concentrations outside this range are also useful. Commonly, an aqueous solution containing from about 125 to 225 grams of hypochlorous acid per liter of water is employed.

Sodium hydroxide, which is reacted with hypochlorous acid in the process of this invention is properly utilized as an aqueous solution thereof. A saturated solution is often most convenient to prepare and use. By way of example, at 0° C., an aqueous solution containing about 420 grams per liter sodium hydroxide is useful. Excesses of hydroxide may be used. Less than saturated solutions are also useful.

Hypochlorous acid and sodium hydroxide are often reacted in about equal molar quantities; however, an alkaline pH such as about pH 12 provides generally better results and an excess of hydroxide is, accordingly, usually employed. Thus, from about 0.9 mole to about 3.0 moles of sodium hydroxide per mole of hypochlorous acid is satisfactory. Lesser amounts may result in incomplete conversion. Greater than preferred amounts are operative but are unnecessary to produce the stable product.

To form the basic sodium hypochlorite preparations from the dry, crystalline anhydrous and hydrated hypochlorites, dry sodium hydroxide is used in proportionate amounts for the desired basic compound. Excess of hydroxide is unnecessary to provide a stable product. By way of example, a hemibasic sodium hypochlorite is prepared from the treatment of 2 moles of hydrated hypochlorite per mole of hydroxide. Similarly, equal molar quantities of the two components will provide the monobasic hypochlorite. Corresponsive amounts of hydroxide and hydrated hypochlorite will provide the predetermined appropriate basic hypochlorite. Basic hypochlorites which are especially useful and which readily result from the treatment set forth herein are the hemibasic, monobasic, dibasic, tribasic, and tetrabasic hypochlorites. Often, basic hypochlorites are formed which do not represent basic hypochlorite compounds of definite and uniform composition. Typically, crystalline basic sodium hypochlorites containing from 1 to 70, and more particularly from 10 to 50, weight percent of sodium hydroxide are useful.

Intimate admixture of the hydrated sodium hypochlorites with the dry, solid sodium hydroxide is readily accomplished by means of ball-milling. This procedure involves grinding the materials to be mixed between inert surfaces such as Carborundum surfaces until the materials have reached a physical state wherein the molecules of the two components are distributed uniformly throughout the mixture.

Hypochlorous acid solution may be added to aqueous sodium hydroxide at any convenient rate; however, a batch-wise dumping of the two reactants may result in poor temperature control with consequent decomposition of the formed product. Additions extended over a long period of time such as dropwise additions are satisfactory. A moderate addition accompanied with stirring will avoid local hot spots and insure complete reaction with a minimum of product loss.

The reaction may be performed in any suitable reactor. Heavy metal impurities such as iron and tin may encourage decomposition of the product and some care should be exercised in their removal. A reactor is generally chosen which is free of these contaminants.

Temperatures at or below room temperature, i.e., about 25° C. or below, but rarely below the freezing temperature of the liquid medium, are operable. Temperatures as high as 50° C. may be used but if sustained may result in product loss. Decomposition losses are even more pronounced if temperatures above 50° C. are used. Temperatures as low as −25° C. or even lower may also be employed; however, special care is required at these low temperatures to maintain the reaction medium liquid. Thus, temperatures of from about −25° C. to about 50° C., and usually from about −5° C. to about 30° C. are preferred.

The process disclosed herein is readily performed at atmospheric pressures. Results are not hindered by the use of pressures other than atmospheric, however.

One useful method of determining the stability of hypochlorite preparations is by observing the infra-red absorption of the O—Cl bond. Thus, the vibrational frequency of the O—Cl bond is a measure of its stability, and hence, the stability of the entire compound to decomposition. By the use of an infra-red analysis of the hypochlorite compounds, the frequency of the O—Cl bond in wave numbers (cycles per centimeter) can be determined by the formula:

$$N = 1/L$$

where N is the wave number (cycles per centimeter) in centimeters$^{-1}$ and L is the wavelength in centimeters. The wave number quantities are directly proportional to the energy changes and higher wave number quantities correspond to greater bond stability. Conversely, low wave numbers correspond to reduced stability of the O—Cl bond.

TABLE I

| Hypochlorite: | O—Cl vibrational frequency in centimeters$^{-1}$ |
|---|---|
| $Ca(OCl)_2$ | 744 |
| $Ba(OCl)_2$ | 719 |
| $Na(OCl)$[1] | 713 |
| $Na(OCl)2H_2O$ [2] | 714 |
| $Na(OCl)OH$ [2] | 719 |

[1] Na(OCl) in solution (water solvent).
[2] Dry, solid hypochlorite preparations of the instant invention.

By reference to Table I, it can be seen that the process disclosed herein prepares solid sodium hypochlorites which are more stable than common sodium hypochlorites in solution by virtue of their increased wave numbers. Thus, this infra-red measuring technique confirms with scientific evidence the observed stability characteristics of the products of this invention.

The following examples illustrate the manner by which this invention may be practiced.

Example I

One mole (40 grams) of sodium hydroxide was slurried in crushed ice. An aqueous hypochlorous acid solution (255 milliliters) containing 181 grams per liter hypochlorous acid was added with stirring to the ice slurry to a pH of 12. The resulting solution was filtered and then evaporated at from 1 to 2 millimeters mercury pressure and at temperatures which ranged from 40° C. to 50° C. until crystals appeared. The crystals were recovered by centrifugation and were dried in a rotary vacuum drying apparatus until a free-flowing solid product was obtained. Table II shows the results of a complete analysis of this solid product.

TABLE II

| Component: | Percent of product |
|---|---|
| NaOCl | 65.01 |
| $H_2O$ of hydration | 32.60 |
| NaCl | 0.03 |
| $NaClO_3$ | 0.64 |
| NaOH | 0.17 |
| $CO_2$ | 0.13 |
| Total alkali as $Na_2CO_3$ | 0.54 |
| $CO_2$ as $Na_2CO_3$ | 0.31 |

A sample of this product showed only 6 percent decomposition after 13.5 months storage at −25° C.

Example II

Two moles of sodium hydroxide pellets were added to water. Hypochlorous acid solution (653 milliliters) containing 150 grams per liter hypochlorous acid was added to a pH of 12 while the temperature of the reaction mixture was maintained at from 20° C. to 25° C. The resulting solution was filtered and was evaporated for 3 hours at from 1 to 2 millimeters mercury pressure and at temperatures which ranged from 52° C. to 64° C. until crystals appeared. The recovered crystals were dried in a rotary vacuum drying apparatus for 2.5 hours at about 50° C. Infra-red tracing indicated the product was essentially anhydrous. No decomposition was observed after storage at −25 °C. for 64 hours.

Example III

A sample of the dry, solid product obtained by the procedure of Example I was intimately admixed with 50 percent by weight dry sodium hydroxide by ball-milling the mixture for 1 hour. The ball-milled material was vacuum dried at from 1 to 2 millimeters mercury pressure and a temperature of 40° C. to remove replaced water of hydration. A free-flowing solid product was obtained. The product was shown to be essentially water-free when analyzed by infra-red. A sample of this product showed only 1 percent decomposition after 83 days storage at 0° C.

Example IV

A portion of cotton fabric was bleached by contacting the cellulosic material in an aqueous solution containing dissolved product obtained by the procedure of Example III. A water:fabric weight ratio of 20:1 was used at a temperature of 135° F. A slight agitation of the bleaching sample was administered during the bleaching operations. Bleaching action was quite rapid, especially in the first 15 minutes, and substantially whitened fabric with no significant change in degradation was removed from the bleaching bath.

In lieu of sodium hydroxide in the previously presented examples, potassium hydroxide may also be used.

Example V

A sample of the product prepared by the procedure of Example III and a sodium hypochlorite aqueous solution were tested for stability Table III illustrates the results of these tests.

TABLE III

| | Aqueous Sodium Hypochlorite | Solid, Basic Sodium Hypochlorite |
|---|---|---|
| Weight percent NaOCl | 15 | 50 |
| Temperature, ° F | 85 | 77 |
| Time, days | 52 | 55 |
| Percent decomposition of NaOCl component | 47 | 40 |

Although unnecessary to provide stable, solid sodium hypochlorite preparations in accordance with this invention, sodium hydroxide, as an additive, and other additives or diluents such as sodium sulfate, sodium tetraborate, sodium nitrate, sodium phosphate, and other common additives or diluents when used as solids may be added to the hypochlorite preparations. These additives contribute to the already enhanced stability. The resulting less concentrated hypochlorite formulation is undesirable from an efficiency standpoint.

While particular reference has been made to the preparation of sodium hypochlorites, potassium and lithium hypochlorites and alkaline earth metal hypochlorites, especially calcium hypochlorite, are also readily prepared by the process of this invention. Thus, substantially pure alkali or alkaline earth metal hypochlorites are prepared by reacting hypochlorous acid substantially free of chloride ion with an appropriate quantity of alkali or alkaline earth metal hydroxide or oxide. The prepared material is subjected to sufficient drying whereby to remove substantially all of the water of solution and the dry stable product is obtained. By way of example, a dry product is obtained by the reaction of chloride ion free hypochlorous acid and calcium hydroxide in an aqueous slurry which product assays 92 percent calcium hypochlorite and contains less than 0.7 percent water insolubles. Similar techniques will provide potassium hypochlorite preparations from chloride ion free hypochlorous acid and potassium hydroxide.

Lithium hypochlorite and alkaline earth metal hypochlorites are inherently more stable than sodium hypochlorite and hence do not require the stringent measures which are needed to protect the sodium hypochlorite from decomposition. However, the processes described hereinbefore to enhance the stability of the sodium hypochlorite such as by forming the basic sodium hypochlorites are applicable to lithium, potassium, and the alkaline earth metal hypochlorites as well.

The hypochlorites contemplated herein may be prepared continuously by use of a continuous evaporator to provide crystals from a solution containing the formed hypochlorite. A predetermined rate through the evaporator may be arranged such that reactants are added at one end of the reactor and the appropriate products are removed from the opposite end thereof.

Alternate to the drying techniques described hereinbefore may be used atmospheric drying in an oven or by infrared lamps or other convenient drying methods. Vacuum drying is, however, much faster and more efficient.

While the invention has been described with reference to the details of certain specific embodiments, it is not intended that the invention be construed as limited thereto except insofar as may be determined by the following appended claims.

We claim:
1. A process of preparing dry, solid stable basic sodium hypochlorite which comprises reacting in aqueous liquid medium hypochlorous acid substantially free of chloride ion with sodium hydroxide to produce sodium hypochlorite, drying this sodium hypochlorite at moderate temperature to provide dry, solid, hydrated sodium hypochlorite, admixing the hydrated sodium hypochlorite with sodium hydroxide and thereafter drying to remove released water of hydration and obtain basic sodium hypochlorite.

2. A method of producing solid, dry, basic sodium hypochlorite which comprises admixing solid sodium hydroxide and dry, solid hydrated sodium hypochlorite, replacing water of hydration with sodium hydroxide and thereafter drying to remove replaced water of hydration.

References Cited
UNITED STATES PATENTS

| | | | |
|---|---|---|---|
| 1,481,038 | 1/1924 | Taylor et al. | 23—86 |
| 2,360,492 | 10/1944 | Hampel | 23—86 |

LEON D. ROSDOL, Primary Examiner

I. GLUCK, Assistant Examiner

U.S. Cl. X.R.

23—86; 252—95, 99, 103